Dec. 6, 1927.

M. H. ROBERTS

POWER REVERSE GEAR

Filed July 6, 1925

INVENTOR
Montague H. Roberts
BY
Synnestvedt & Lechner
ATTORNEYS

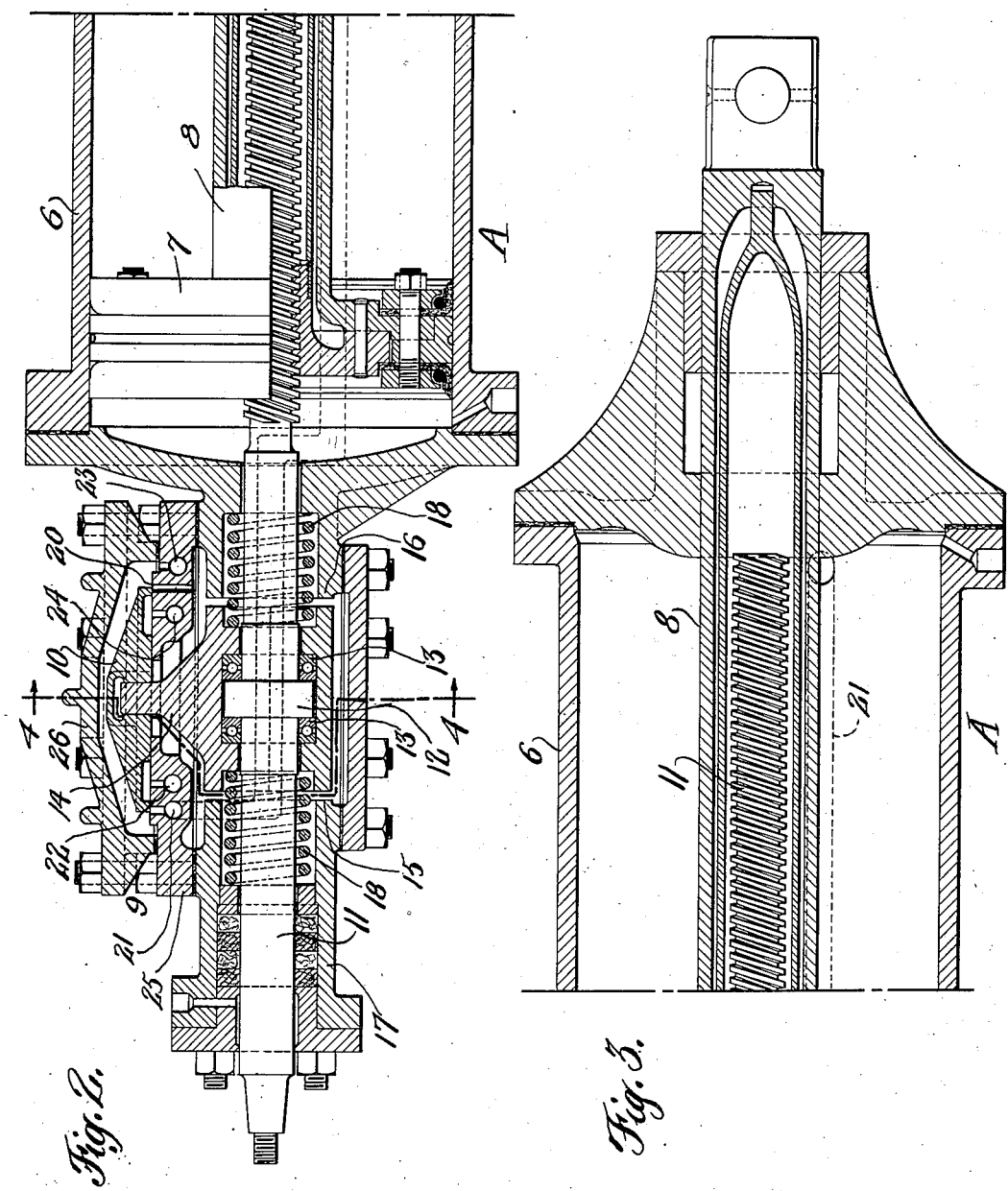

Patented Dec. 6, 1927.

1,651,838

UNITED STATES PATENT OFFICE.

MONTAGUE H. ROBERTS, OF ENGLEWOOD, NEW JERSEY, ASSIGNOR TO FRANKLIN RAILWAY SUPPLY COMPANY, A CORPORATION OF DELAWARE.

POWER-REVERSE GEAR.

Application filed July 6, 1925. Serial No. 41,597.

This invention relates to fluid operated power reverse gears for locomotives such as shown in my Patent No. 1,500,685, granted July 8, 1924. It is often necessary and frequently desirable to operate the reverse gear manually, for example, when there is a failure of the air or other operating medium while on the road, in movement of the locomotive about the round house when there is no air available or in setting the valves of the locomotives when in the shop.

It is the primary object of the present invention to provide a reverse gear, of the type shown in my patent, which can be easily operated by hand, without placing undue strain on any of the parts and this without undue exertion.

A further object of my invention is the provision of means to prevent shock to the valve gear in case the engine should be operated on the road without air pressure in the cylinder.

Another object is the provision of a valve casing which will permit of ready access to the valve operating mechanism and other parts within the casing.

Another object is the provision of a valve seat which can be removed for regrinding, etc. on the bench.

These, together with such objects as may hereinafter appear or are incident to my invention I obtain by means of a construction which I have illustrated in preferred form in the accompanying drawings, wherein.

Fig. 2 is a longitudinal section of the rear portion of the gear cylinder and associated mechanisms;

Fig. 3 is a longitudinal section of the forward portion of the gear; and

Figure 1:
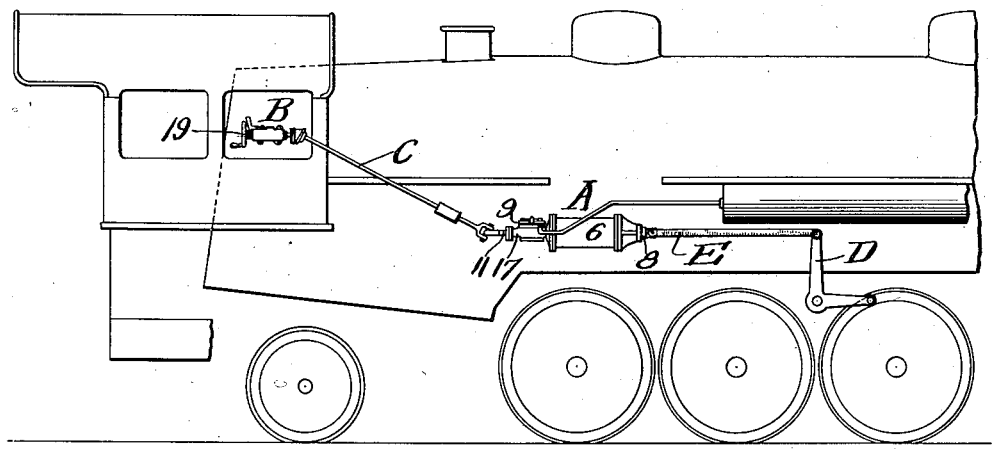
Fig. 1 is a diagrammatic side elevation of a locomotive equipped with my improved gear.
Figure 4:
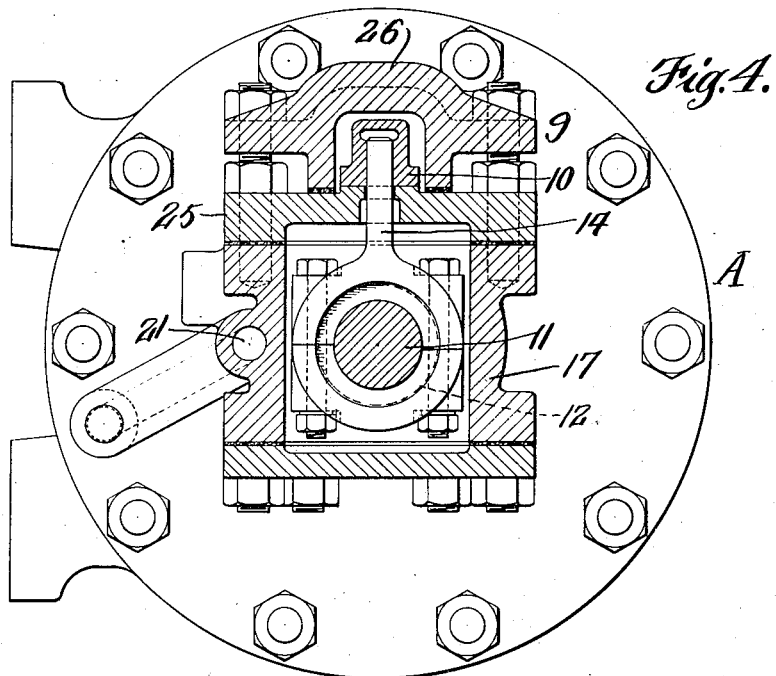
Fig. 4 is a cross section taken on the line 4—4 of Fig. 2.

Referring to Fig. 1 it will be seen that I have diagrammatically illustrated a portion of a locomotive, the reference letter A indicating a power reverse gear; B an operating mechanism for the gear located in the cab; C a connection between the gear A and the mechanism B; and D the bell crank of the usual valve motion device, said crank having connection with the reverse gear thru the reach rod E.

The gear shown in this instance in general comprises a cylinder 6, a piston 7 having a piston rod 8 adapted to be connected to the reach rod E, a valve casing 9 for the D-valve 10, and an operating rod or shaft 11 having screw threaded engagement with the piston 7.

The simple and novel arrangement of parts thru which I am enabled to effectively operate the gear manually, when it becomes necessary or when desirable to do so, will now be described, from which description it will become apparent that the advantages of manual operation as well as pressure operation can be had thru my invention, the mode of operation being the same in either case, except that when manually operating pressure fluid is not supplied to the valve chest, in other words the valve does not function to control the movement of the gear.

The operating rod or shaft 11 is provided with an enlarged collar-like portion 12 having anti-friction bearings 13 at either side thereof. An upwardly extending tongue-like member 14 is carried on the shaft 11 by means of the bearings 13 which permits the shaft to be rotated without rotating the member 14, such member however being held against longitudinal displacement with respect to the shaft by the collar-like portion 12. Hence it will be seen that any longitudinal movement transmitted to the shaft causes the member 14 to be correspondingly moved, as will be the valve 10 by virtue of its connection with said member. The shaft is limited in its movement in either direction by the shoulders or stops 15 and 16 provided in the cylinder head 17 there being cushioning springs 18—18 interposed between the member 14 and the head 17 for absorbing any shocks of the valve gear which might be transmitted thru the piston and shaft, thus preventing pounding of the member 14 against the stops 15 and 16.

The operation of the gear by fluid pressure is as follows. The shaft or rod 11 is rotated by means of the hand wheel 19 of the operating mechanism B, located in the cab, which rotary motion is transmitted to the shaft 11 thru the medium of the connection C having a slip joint conveniently located within its length, whereupon the shaft 11 moves longitudinally by virtue of its screw threaded engagement with the piston, carrying with it the valve 10. Assuming now that a left hand thread is used (as shown in the drawings), and that the hand wheel is turned to the right, the shaft 11 moves rearwardly, the piston 7 acting as a fulcrum, carrying with it of course the valve 10 and completely uncovering the port 20 and admitting fluid pressure from the valve chest to the rear of the piston 7, at the same time connecting the port 21 which communicates with the forward end of the cylinder with the exhaust port 22. Fluid pressure is supplied to the valve chest thru the port 23.

The piston now moves forward carrying with it the shaft 11 and valve 10 bringing it to neutral position covering both the ports 20 and 21 except for a slight bleed of pressure, and holding the piston in the selected position of cut-off. The mode of operation for rearward positions is very similar in which case however the hand wheel is rotated to the left and the port 21 uncovered for admitting pressure to the forward end of the piston and the exhaust port 24 is connected with the port 20.

If it is desired to manually operate the gear, without the use of fluid pressure, the hand wheel is turned as before and the operation is as follows. Assuming the hand wheel to be turned to the right, the shaft 11 moves rearwardly as before until the stop 15 is engaged and then upon further rotation of the hand wheel the piston begins to move forward, the stop 15 acting as a fulcrum, such rotation being continued until the desired point of cut-off is reached. In order to reduce the friction when the gear is thus manually operated the anti-friction bearings 13—13 are provided which are arranged to take the longitudinal thrusts in either direction. Hence it will be seen that the shaft 11 can be rotated without undue exertion and without undue strains on the operating parts by reason of the friction on the shaft being reduced to a minimum. If desired the springs 18—18 may be of such tension that when the gear is manually operated they will act as yielding abutments, in which case the longitudinal movement of the shaft 11 and member 14 would not be great enough to cause the member 14 to strike the abutments 15 and 16.

Reverting now to the valve and valve chest arrangement it will be seen that the rearwardly extending portion of the cylinder head 17 constitutes a base for the valve chest and that a removable valve seat 25 is interposed between said base and the valve chest cap 26. By this arrangement I am enabled to conveniently machine, or regrind the wearing surface of the valve seat 25 by removing the same for work on the bench. In this connection it is further pointed out that when the seat is removed an opening is uncovered over the shaft 11 for the insertion of the upper half of the tongue-like member 14.

The advantages of a gear constructed in accordance with my invention are many fold, some of which have been pointed out in the foregoing and others will become apparent to those skilled in the art.

I claim:

1. In a power reverse gear, the combination of a cylinder, a piston, a pressure fluid controlling valve, a revoluble shaft operatively connected with said piston, a collar on said revoluble shaft, a valve operating member carried by said shaft having an annular recess for receiving said collar, an antifriction bearing lying to each side of said collar, said bearings engaging the collar and the edges of said recess, and abutments engageable by said member for limiting the longitudinal movement of the shaft in either direction.

2. In a power reverse gear, the combination of a cylinder, a piston, a pressure fluid controlling valve, a revoluble shaft operatively connected with said piston, a collar on said revoluble shaft, a valve operating member carried by said shaft having an annular recess for receiving said collar, an antifriction bearing lying to each side of said collar, said bearings engaging the collar and the edges of said recess, and abutments engageable by said member for limiting the longitudinal movement of the shaft in either direction, together with a spring lying to each side of the valve operating member, said springs engaging said member at one end and engaging a fixed part at the other end.

3. In a power reverse gear, the combination of a cylinder, a piston, a pressure fluid controlling valve, a revoluble shaft having screw threaded connection with said piston, a collar on said revoluble shaft, a valve operating member carried by said shaft having an annular recess for receiving said collar, an anti-friction bearing lying to each side of said collar, said bearings engaging the collar and the edges of said recess, and abutments engageable by said member for limiting the longitudinal movement of the shaft in either direction, whereby when it is desired to move the piston by pressure fluid the shaft moves longitudinally to move the valve and when it is desired to move the piston manually the shaft is held against longitudinal movement thereby causing the piston to move, together with hand operated means for rotating the shaft.

4. In a power reverse gear, the combination of a cylinder, a piston, a pressure fluid controlling valve, a revoluble shaft operatively connected with said piston, a collar on said revoluble shaft, a longitudinal split valve operating member carried by said shaft having an annular recess for receiving said collar, an antifriction bearing lying to each side of said collar, said bearings engaging the collar and the edges of said recess, and abutments engageable by said member for limiting the longitudinal movement of the shaft in either direction.

In testimony whereof, I have hereunto signed my name.

MONTAGUE H. ROBERTS.